United States Patent
Sherman

[11] Patent Number: 6,155,629
[45] Date of Patent: *Dec. 5, 2000

[54] MOLDED MATS WITH RELEASABLE FLOOR ATTACHMENT SYSTEM

[75] Inventor: Raymond O. Sherman, Fairfield, Ohio

[73] Assignee: Nifty Products, Inc., Hamilton, Ohio

[*] Notice: This patent is subject to a terminal disclaimer.

[21] Appl. No.: 09/072,731

[22] Filed: May 4, 1998

[51] Int. Cl.[7] .............................. B62D 25/20; B32B 3/02
[52] U.S. Cl. ................... 296/97.23; 428/99; 16/4
[58] Field of Search .................. 296/97.23; 428/99, 428/100; 16/4, 17.1, 16, 8

[56] References Cited

U.S. PATENT DOCUMENTS

| | | | |
|---|---|---|---|
| 2,651,540 | 9/1953 | Zullo | 296/97.23 |
| 3,391,959 | 7/1968 | Stata | 296/97.23 |
| 4,588,628 | 5/1986 | Roth | 428/99 X |
| 4,921,742 | 5/1990 | Altus | 428/99 X |
| 4,984,838 | 1/1991 | Kim | 296/97.23 X |
| 5,207,963 | 5/1993 | Grace | 264/163 |
| 5,288,121 | 2/1994 | Graves | 296/97.23 X |
| 5,891,546 | 4/1999 | Sherman | 296/97.23 X |
| 6,027,782 | 2/2000 | Sherman | 428/88 |

FOREIGN PATENT DOCUMENTS

| | | | |
|---|---|---|---|
| 58-183322 | 10/1983 | Japan | 296/97.23 |
| 9116218 | 10/1991 | WIPO | 296/97.23 |

*Primary Examiner*—D. Glenn Dayoan
*Assistant Examiner*—Patricia Engle
*Attorney, Agent, or Firm*—Charles R. Wilson

[57] ABSTRACT

A floor mat is produced to fit the carpeted floor compartment area of a van, pickup truck, sport utility vehicle or other vehicle having a floor which is substantially flat and even with a door sill. The floor mat has a flat base with a retention system operably associated with the door sill. In one embodiment, the floor mat has raised walls near each of its outside edges which form a tray-like central area. At least one of the raised walls is double walled with a substantially horizontally extending floor engaging peripheral lip. The tray-like central area of the floor mat catches debris. It is readily cleaned simply by removing the full mat from the vehicle.

23 Claims, 10 Drawing Sheets

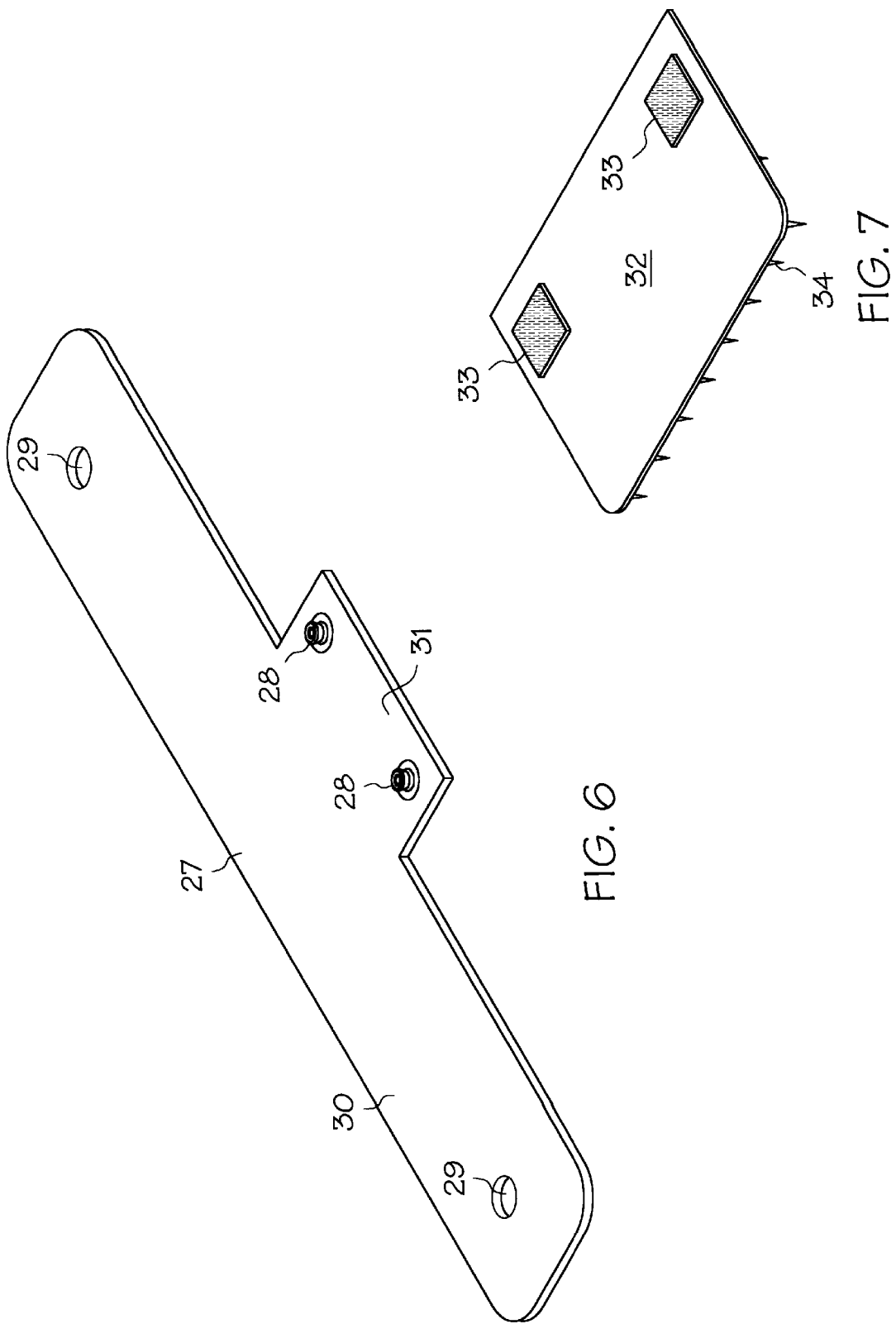

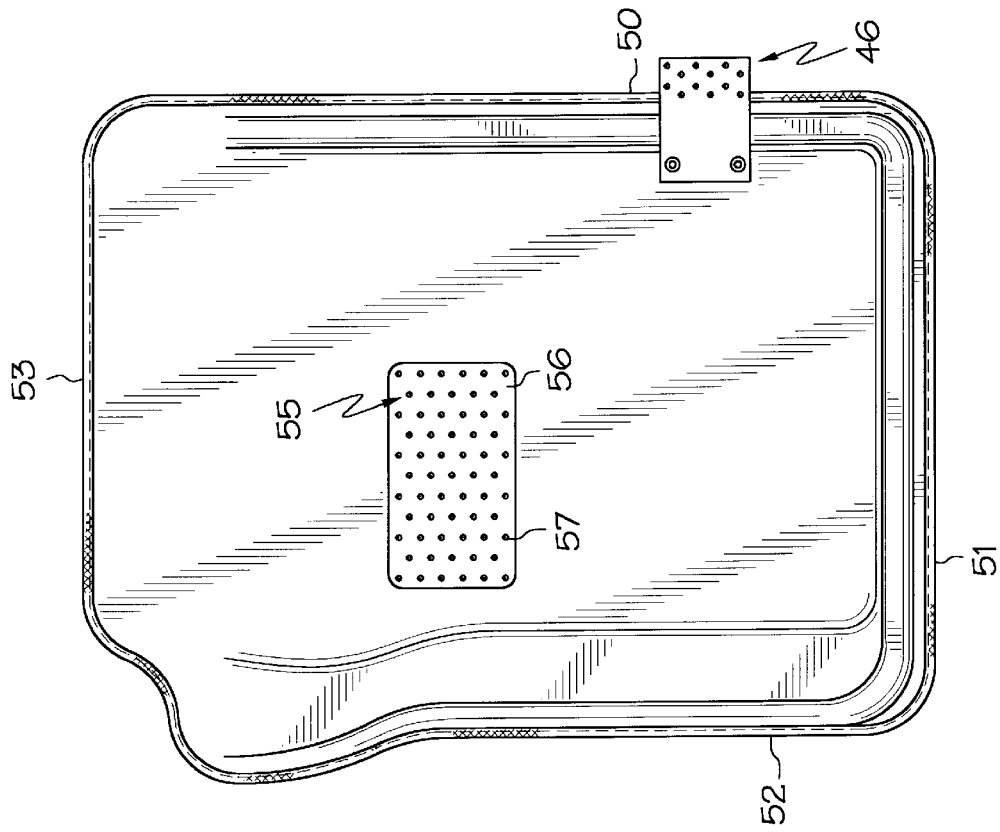
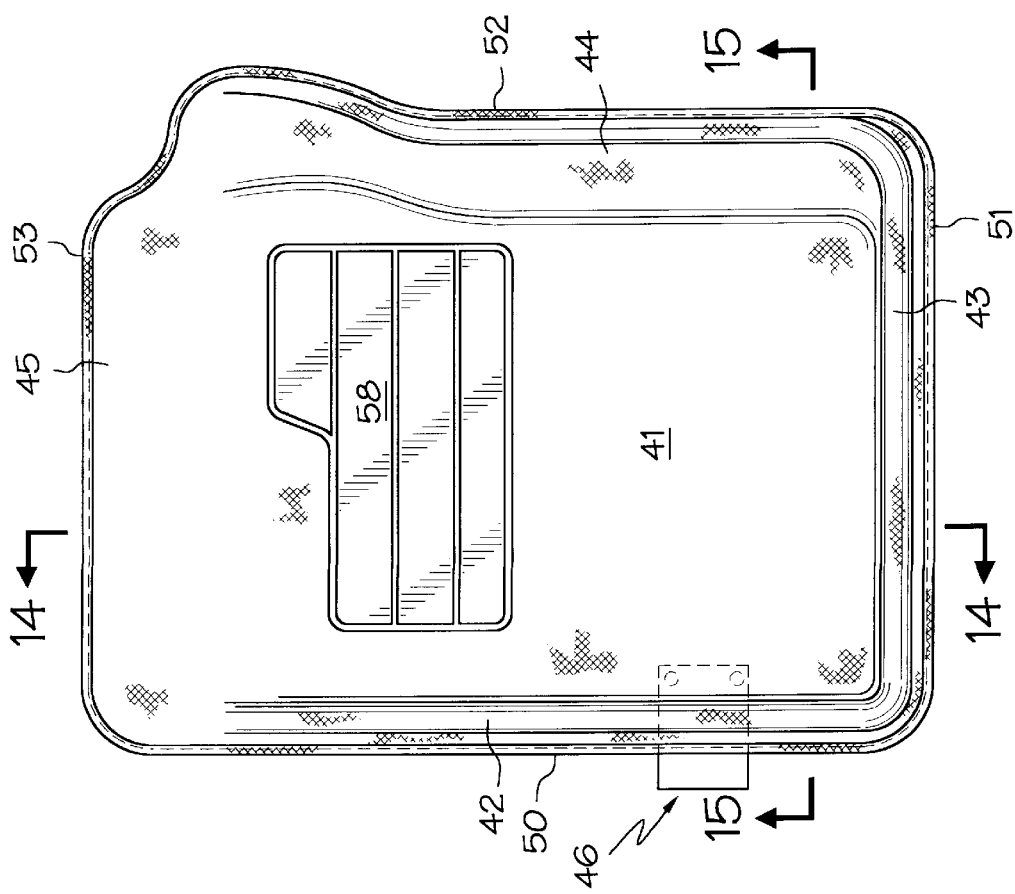

MOLDED MATS WITH RELEASABLE FLOOR ATTACHMENT SYSTEM

This invention relates to molded floor mats designed to overlie a carpeted floor area of a vehicle with a flat floor surface which extends to a door sill. More particularly, the invention relates to molded floor mats with an enhanced retention system to retain the mat in place when used in a van, pickup truck, sport utility vehicle or other similar vehicle.

Vans, pickup trucks and sport utility vehicles are becoming increasingly popular with the general driving public. They are no longer being used just for light commercial usage. As a result, their floors are also being carpeted. However, the floors of such vehicles do not have a floor well which is so common in most automobiles. The floors, other than at the firewall or center hump areas, are more flat and substantially even with an exterior door sill. Vacuuming away loose debris in such a flat area is relatively easy. However, the vehicle's owner is also often concerned with more permanent stains and surface wear. Floor mats are needed to meet the concern.

Producing contoured floor mats at a reasonable cost to neatly fit a floor of a van, pickup truck or sport utility vehicle is feasible. Holding them in place under normal use conditions is more difficult. Conventional two sided tapes are of some use. A more durable retention system designed specifically for the aforementioned vehicle, though, is desired. Any retention system must securely hold the floor mat in place. It also must permit a ready removal of the floor mat for thorough cleaning or replacement.

There has now been developed a floor mat primarily for use in vans, pickup trucks and sport utility vehicles which fit in place and can be made to stay in place. In accord with a demonstrated need, the floor mats of this invention are contoured to neatly fit any floor compartment area and have a retention system to securely, but removably, hold them in place.

SUMMARY OF THE INVENTION

Molded floor mats are dimensioned to fit into floor compartment areas of vans, pickup trucks, sport utility vehicles and vehicles with similarly configured floors. The floor mat has a flat base. In one embodiment, a floor mat also has four raised walls which form a tray-like central area to catch debris. A raised wall which is positioned adjacent a door sill is double walled and has a substantially horizontally extending floor engaging peripheral lip. Other raised walls are either double walled with the floor engaging peripheral lip or are single wall with a peripheral lip which structurally blends with the vehicle's interior contour. The floor mats of the invention also have a retention system. The retention system includes a retention plate which is removably secured to an underside of the floor mat. The retention plate is configured to be immovably held by the door sill.

BRIEF DESCRIPTION OF DRAWINGS

FIG. 6 is a top plan view in perspective of a retention plate used with the floor mat of FIG. 5.

FIG. 7 is a top plan view in perspective of a retention plate using hook or loop fasteners as part of a retention system for a floor mat of the invention.

FIG. 11 is a top plan view of the floor mat of FIG. 10.

FIG. 12 is a bottom plan view of the floor mat of FIG. 10.

DETAILED DESCRIPTION OF THE INVENTION

The floor mats of this invention are intended for use in the carpeted floor compartment areas of those vehicles having substantially flat floors which extend to the exterior at a door sill. These vehicles primarily include vans, pickup trucks and sport utility vehicles. Different makes and models of such vehicles have different shaped floor compartment areas. However, all lack a floor well and instead have the substantially flat floor which lies in substantially the same plane as a door sill.

The invention is described with reference to the drawings wherein a particular shaped floor mat intended for one commercially available pickup truck model is shown. It should be understood that other floor mats having similar contoured areas designed for use in other vehicles of the type envisioned in this invention are contemplated.

Figure 1:
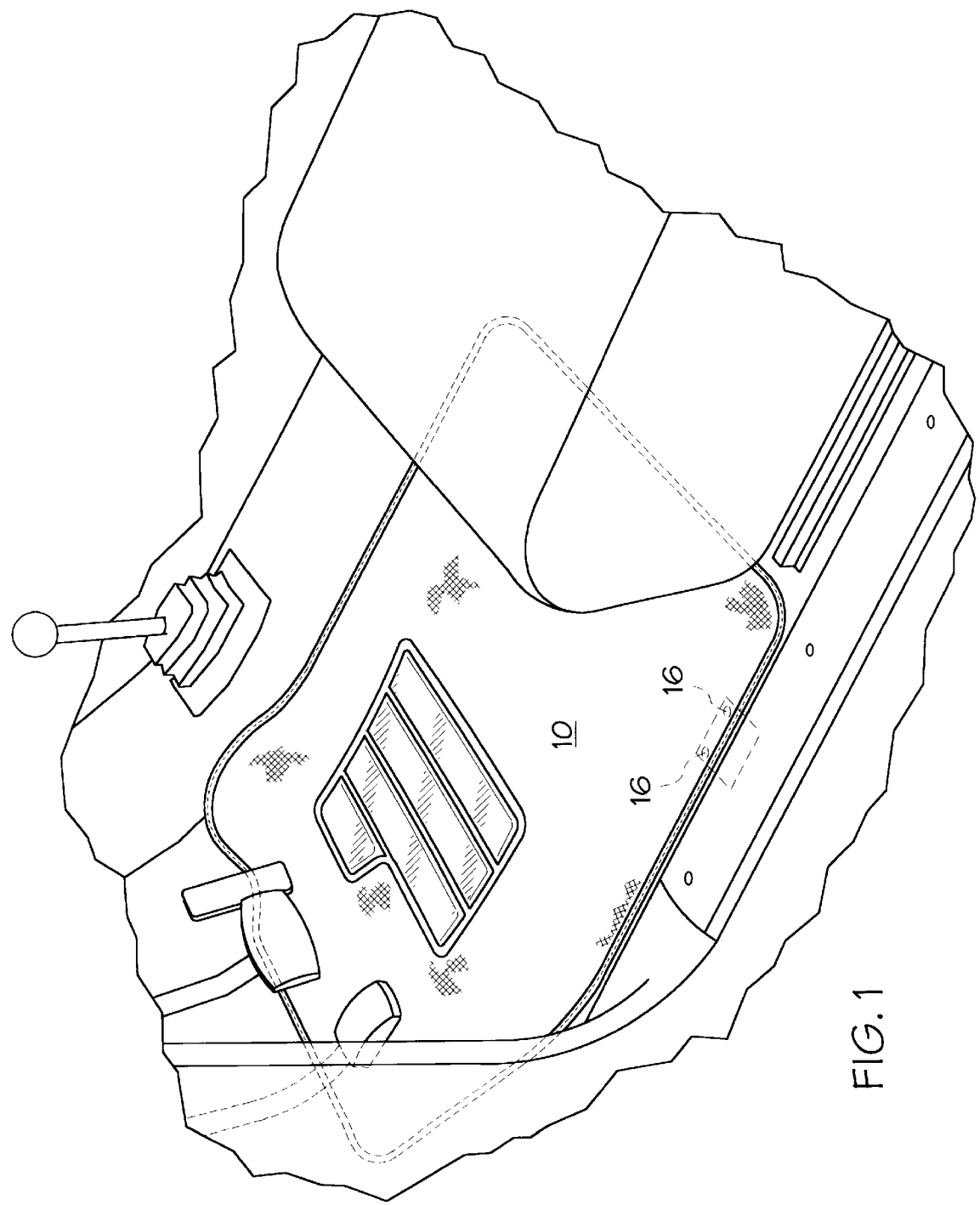
FIG. 1 is an environmental view showing a floor mat of the invention in perspective and showing a retention system in phantom.
Figure 2:
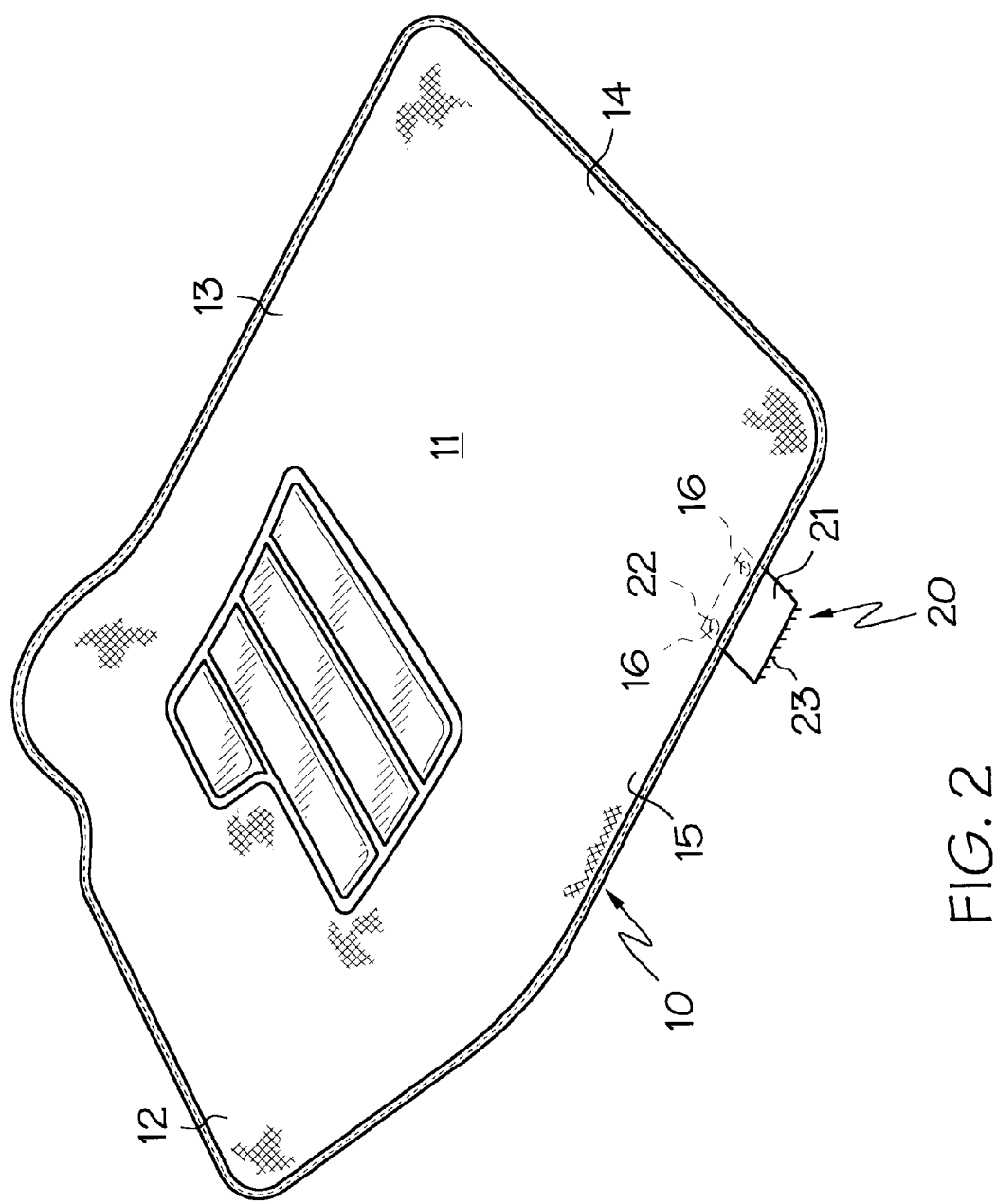
FIG. 2 is a perspective view of the floor mat of FIG. 1 with the retention system partially exposed.

With reference to FIGS. 1 and 2, there is shown a floor mat 10 of the invention. The shape of the depicted floor mat 10 fits the profile of the driver's side of the pickup truck. The floor mat 10 has a substantially flat base 11 with a front section 12 which is shaped to slope upwardly to directly overlie an upwardly sloped firewall of the pickup truck. Similarly, a side section 13 of the floor mat 10 opposite the door side is contoured to accommodate the truck's center hump area. A back side section 14 and a door sill side section 15 of the floor mat 10 are both substantially flat and lie directly on the truck's carpeted floor surface. As evident in FIGS. 1 and 2, the underside of the floor mat has two female snap buttons 16 near the mat's door sill side 15. The snap buttons are spaced apart at least about one inch, preferably from about two inches to about five inches, and form a part of the mat's retention system. The snap buttons mate with male snap buttons found on a retention plate as described in detail in the immediately following paragraphs.

Figure 3:
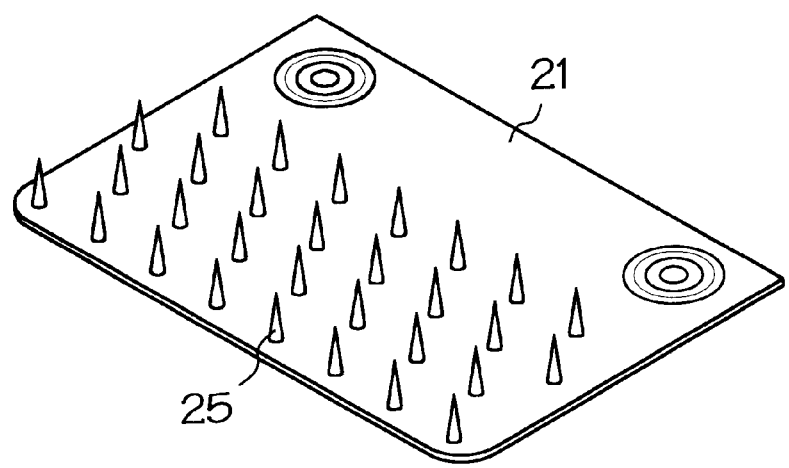
FIG. 3 is a bottom plan view in perspective of a retention plate used with the floor mat of FIG. 1.
Figure 4:
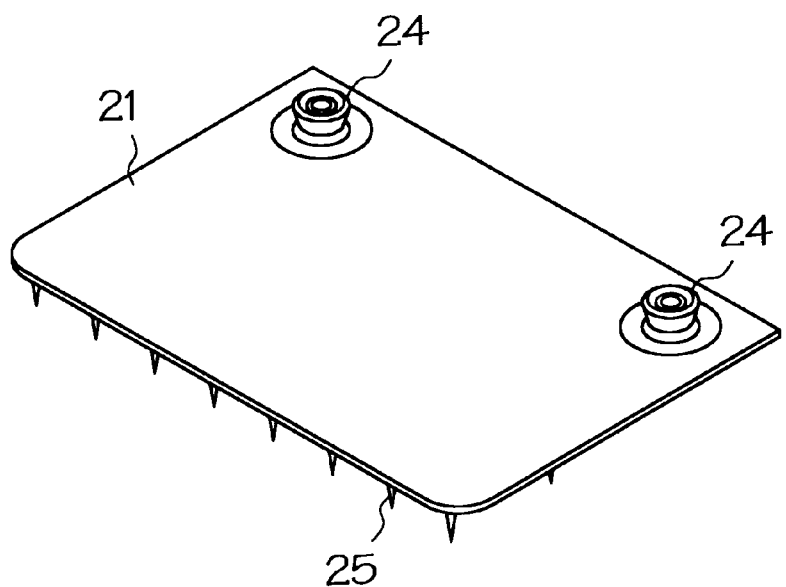
FIG. 4 is a top plan view in perspective of the retention plate of FIG. 3.

Still with reference to FIG. 2, the floor mat 10 also has a retention system 20 comprised of a floor engaging retention plate 21, mat attachment means 22, and floor attachment means 23. The retention plate 21 is best seen in FIGS. 3 and 4. It is substantially flat. It is also rectangular-shaped and ranges from about two inches to about five inches in width and about three inches to about fifteen inches in length. A preferred retention plate ranges from about three inches to about four inches in width and about four inches to about six inches in length. The dimensions of the plate are not critical. In fact, the plate can have a length which extends the full length of the floor mat's flat surface on its door sill side. The upperside of the retention plate 21 has two male snap buttons 24 positioned near one edge. The snap buttons 24 are spaced apart a sufficient distance to be in alignment with the female snap buttons 16 on the underside of the floor mat 10 and snap together when pressure is applied. The underside of the retention plate 21 preferably has a set of protrusions 25 which extend vertically from the plate to engage the vehicle's carpeted floor. The portion of the retention plate which extends under the door sill and the protrusions 25 which engage the carpeted floor form the floor attachment means 23. It should be evident the retention plate 21 is configured to fit under the vehicle's door sill and be trapped by it. The retention plate 21 is also removably attached to the floor mat 10 by interaction of the mating snap buttons 16 and 24.

While not shown, a plurality of retention systems 20 can be used. For example, two retention plates 21 can be substantially equi-spaced along the floor mat's door sill side for enhanced retention. Three substantially equi-spaced retention plates can as well be used and provide optimum mat retention.

The floor mat 10 is a composite of one piece construction. That is, it is unitary in structure, there being no seams, overlapping edges or anything of this sort. The floor mat has two distinct layers. A tufted carpet represents the top layer. The carpet includes a backing and pile yarns which are secured to the backing and extend therefrom to form a pile surface on the carpet's top surface. The backing is a woven or non-woven fibrous material. The pile yarns can be made from natural or synthetic materials. Typically, they are made from a synthetic material because such materials are more durable and clean better. Polyester, polypropylene, and nylon are examples of widely used pile yarn materials. The yarns are usually secured to the backing by a binder composition.

A thermoplastic material represents the second layer and covers the underside of the carpet. The thermoplastic plastic provides a tough, elastic and non-tacky backing. Primarily, it imparts stiffness and moldability to the carpet so that the carpet can be molded to a desired deeply contoured shape and such shape be retained. Examples of suitable thermoplastics include polymers of ethylene and propylene, copolymers of ethylene with ethylenically unsaturated monomers, e.g. ethylenevinyl acetate, acrylates, polyvinyl chlorides and styrene-butadiene polymers. Preferably, as explained below, the thermoplastic material is capable of being softened at a temperature of from about 190 degrees F. to about 240 degrees F. to become readily moldable. The backing is applied to the carpet in any manner, e.g. by dispersion coating, extrusion coating, calendaring and lamination. Thermoplastic backed carpets of the nature described are commercially available in a range of colors and weights.

Figure 5:
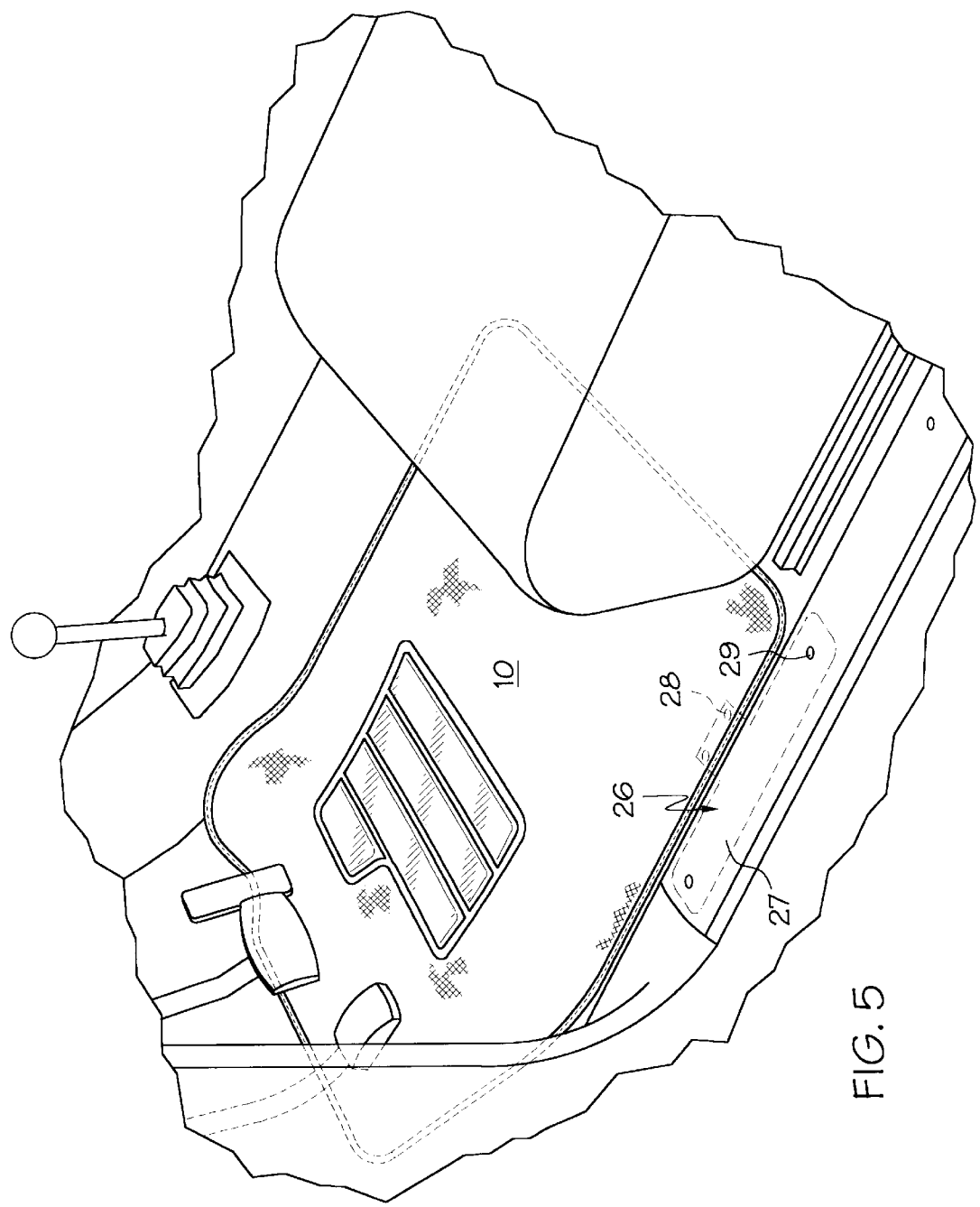
FIG. 5 is a perspective view of a floor mat of the invention with another retention system illustrated in phantom.

FIGS. 5 and 6 illustrate another retention system for holding the floor mat 10 in place. The retention system 26 has a substantially flat retention plate 27 with male snap buttons 28 and door sill bolt receiving holes 29. The retention plate has an elongated rectangular-shaped main body 30 with a laterally extending tab 31. The main body 30 ranges from about two inches to about three inches in width and about five inches to about fifteen inches in length. The tab 31 is preferably centered along a long edge of the main body and is about one inch to about two inches in width and about two inches to about five inches in length. A portion of the main body 30 of the retention plate 27 is dimensioned to fit under the door sill with the tab 31 extending inwardly. The male snap buttons 28 are aligned with the female snap buttons 16 found on the underside of the overlying floor mat 10. The receiving holes 29 are positioned to receive the door sill bolts which are used to hold the door sill in place.

As evident in FIG. 5, the retention plate 27 is positioned under the door sill and is held in place by the door sill bolts. As readily imagined, the bolts are initially removed, the retention plate slipped under the door sill, its position adjusted until the holes 29 are in alignment with the door sill holes and then the bolts reinstalled. The retention plate is thus held securely in place. Next, the floor mat 10 is installed by adjusting its position until the male and female snap buttons match up. Applying a force to the buttons causes them to snap together.

Mat attachment means and floor attachment means other than as described above with reference to FIGS. 1–6 can be used. For example, in place of the snap buttons on the floor mat's underside and on the retention plate's upperside, mating hook and loop fasteners better known as Velcro fasteners can be used. FIG. 7 illustrates this preferred mat attachment means used with a retention plate 32 of the type described above with respect to FIGS. 1–4. As shown, hook or loop fastener patches 33 are positioned on the retention plate 32 near one edge. While not shown, a floor mat has mating hook or loop fastener patches on its underside and aligned with the retention plate fastener patches. An adhesive on an underside of the fastener patches hold them in place. Protrusions 34 on an underside of the retention plate and near an edge opposite the fastener patches can be used for enhanced interaction with the carpeted floor surface of the vehicle.

Figure 8:
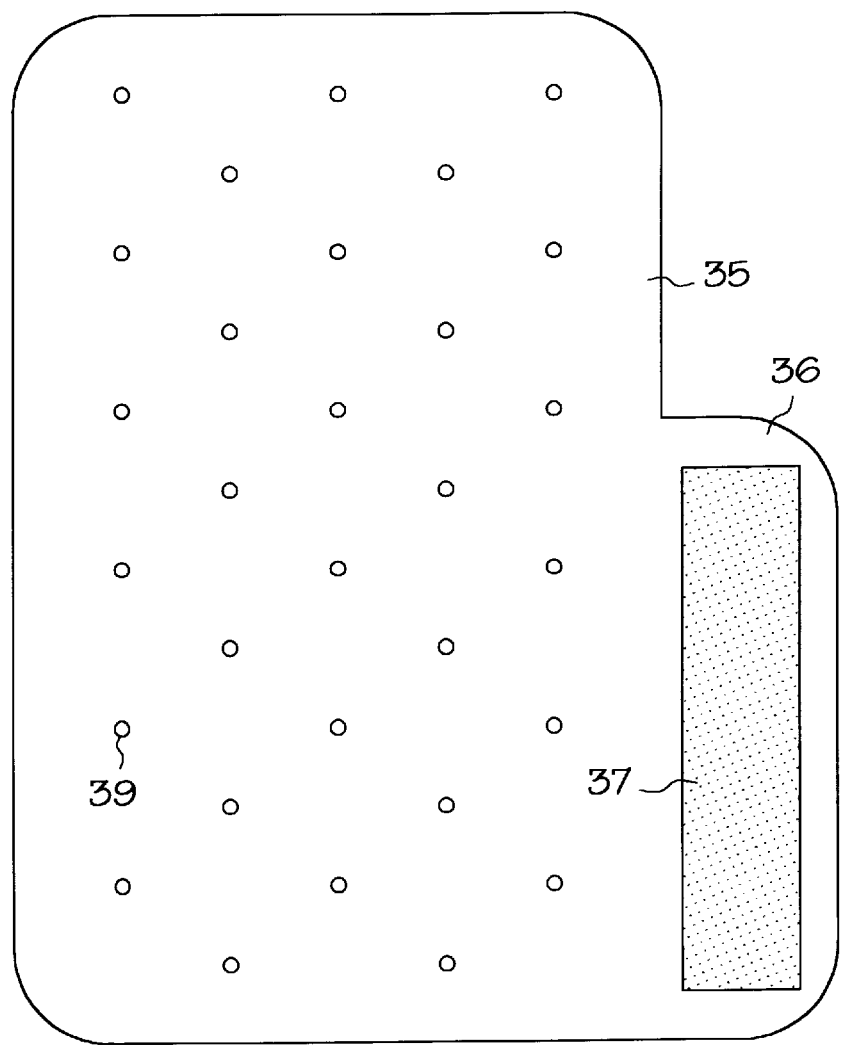
FIG. 8 is a top plan view of another retention plate using door sill spacers as part of a retention system for a floor mat of the invention.
Figure 9:
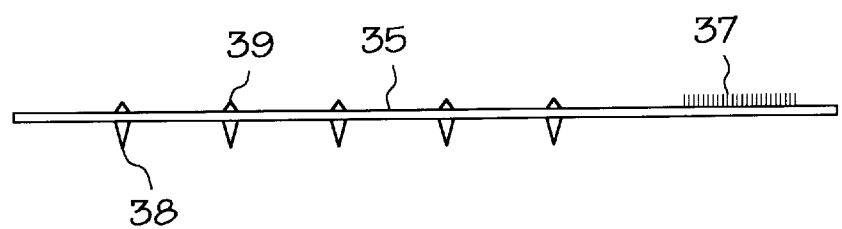
FIG. 9 is a side elevational view of the retention plate of FIG. 8.

FIGS. 8 and 9 illustrate a highly preferred retention plate used as part of a retention system of the invention. The retention plate 35 is a thin polymeric plate with a tab portion 36 extending from one side of the plate's main body. A fastener patch, e.g. a hook or loop fastener patch 37 is positioned on a top side of the tab portion 36 to interact with a mating hook or loop fastener positioned on a bottom side of a floor mat and in alignment therewith. A set of protrusions 38 extend from the bottom side of the retention plate's main body. The protrusions provide enhanced interaction with the carpeted floor surface of the vehicle. About two to about eight protrusions per square inch of surface area provide the desired enhanced carpet gripping interaction. The protrusions preferably range from about 300 mils to about 500 mils in length.

In accord with this embodiment of the invention, a set of door sill spacers 39 extend from the top side of the retention plate's main body. Many door sills are essentially an elongated metal strip which have a generally arch-shaped or raised center profile. A hollow space exists directly below it. The spacers 39 on the retention plate 35 receive and transmit a downward holding force from the door sill of a vehicle when the sill is properly installed. As a result, the retention plate is more immovable or trapped in place by the door sill itself. The spacers preferably are equi-spaced on the retention plate's main body with a spacer density of about two to about eight spacers per square inch. Each spacer is preferably about 100 mils to about 300 mils in length.

FIGS. 10–15 illustrates a highly preferred floor mat 40. The floor mat has a substantially flat base 41 and raised walls 42, 43, 44 and 45 near outside edges of the flat base 41. A retention system 46 similar to that described with reference to FIGS. 1–4 holds the floor mat 40 in place. The four raised walls of the floor mat form a tray-like central area.

Figure 10:
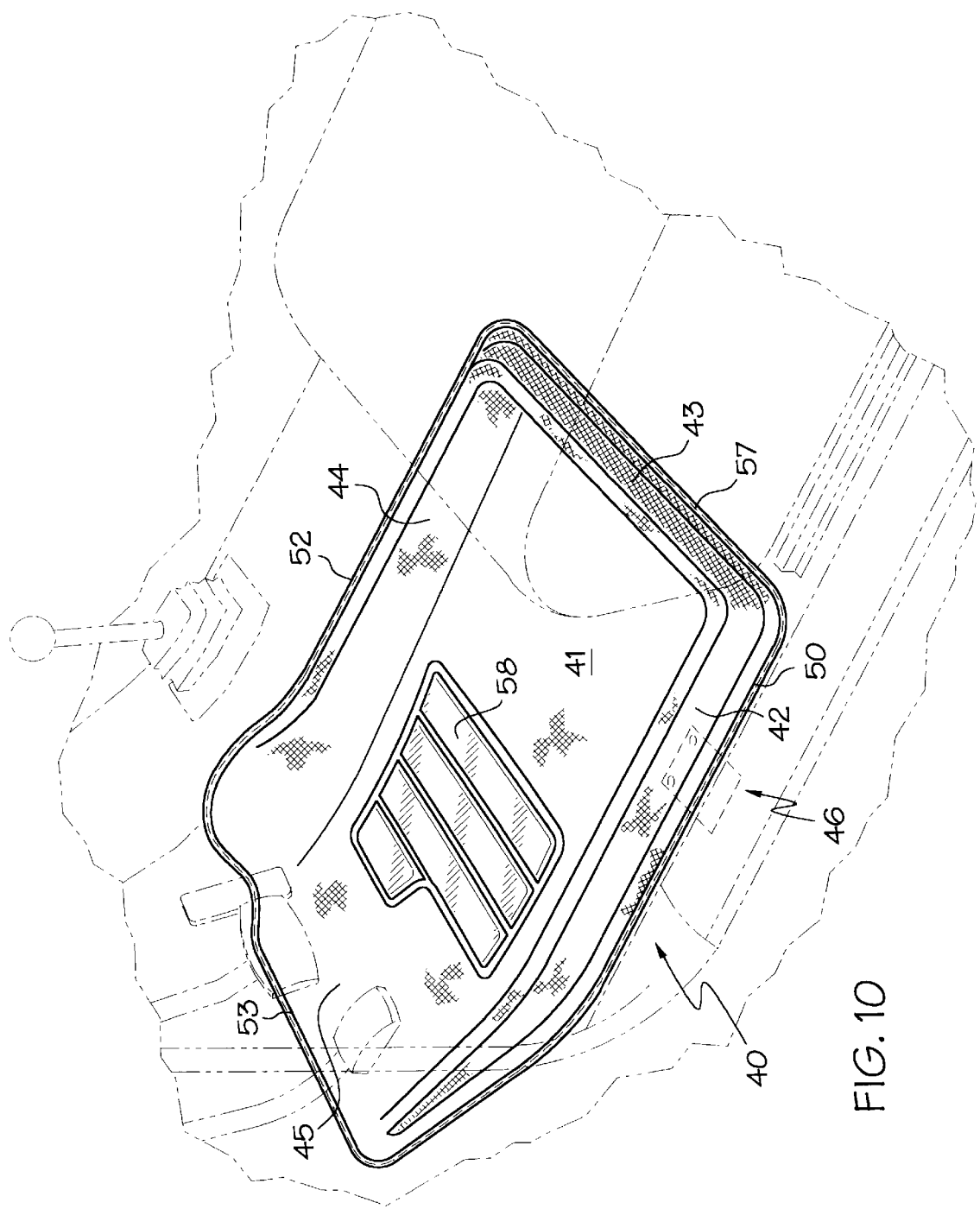
FIG. 10 is an environmental view showing a preferred floor mat of the invention in perspective.
Figure 13:
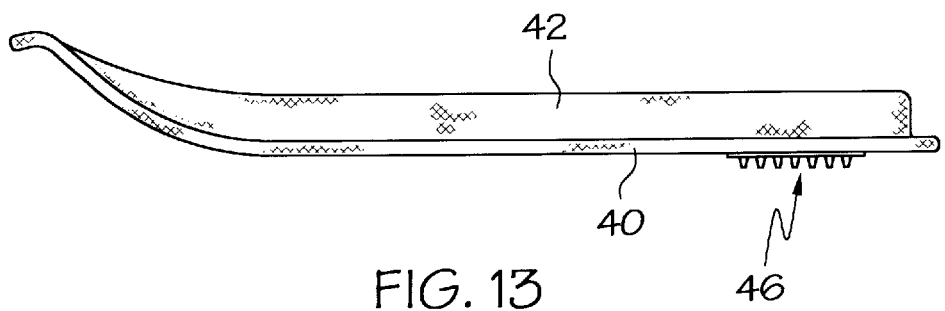
FIG. 13 is a side elevational view of the floor mat of FIG. 10.
Figure 14:
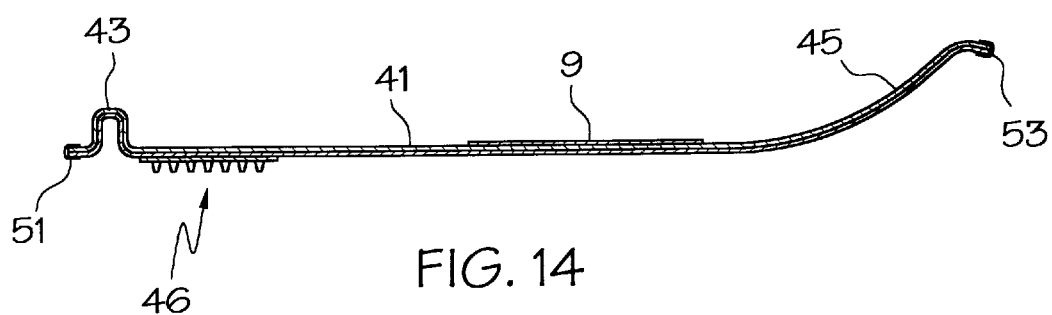
FIG. 14 is a sectional view of the floor mat of the invention taken along line 14—14 of FIG. 11.
Figure 15:
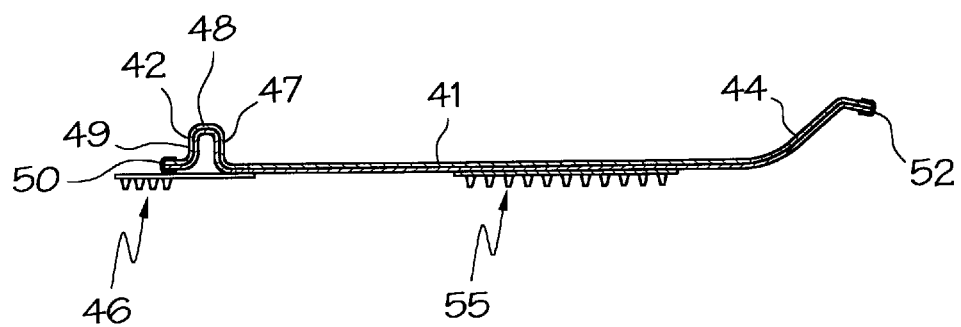
FIG. 15 is another sectional view of the floor mat of the invention taken along line 15—15 of FIG. 11.

The floor mat 40 has two peripheral lips near the raised walls 42 and 43 which are substantially flat and on the same plane as the flat base. With reference to FIGS. 10 and 15, the first raised wall 42 of the floor mat 40 is substantially vertical. It is double walled with an inside wall 47 which extends substantially vertically from the flat base 41 up to about three inches, preferably about one inch to about two inches, a substantially horizontal top wall 48, and an outside wall 49 which extends substantially vertically down to the approximate same plane as the flat base 41. A floor engaging peripheral lip 50 extends substantially horizontally from the outside wall 49. Similarly, and with reference to FIG. 14, the second wall 43 which extends at an about right angle to the first wall 42 is also double walled with a substantially horizontally extending floor engaging peripheral lip 51. The peripheral lips 50 and 51 lie in substantially the same plane as the flat base 41 of the floor mat.

The third wall 44 of the floor mat 40 extends at an about right angle from the second wall 43 and runs in the same direction as the first wall. The third wall 44 of the floor mat 40 is intended to lie along the center hump of the pickup truck. Accordingly, as seen in FIG. 15, the third wall 44 extends vertically upwardly with a substantially horizontally extending peripheral lip 52. The lip 52 abuts against the center hump of the truck and is intended to structurally blend with it to present a smooth line of contact.

Extending at another about right angle from the third wall 44 of the floor mat 40 back towards the first wall 42 is the fourth wall 45. The fourth wall 45 slopes upwardly and away from the substantially flat base 41. It is angled to fit flush with the firewall of the pickup truck. As best seen in FIG. 14, a peripheral lip 53 extends substantially horizontally from the fourth wall to engage a surface of the firewall in a smooth continuous line.

As should be evident, the molded floor mat 40 conforms to the driver side front floor area of the pickup truck by abutting against the center hump, by being flush with the firewall and by sitting flat at the door sill and the seat area opposite the firewall. The profile of the raised wall adjacent the door sill is low and as a result does not interfere with the driver getting into or out of the pickup truck.

The floor mat 40 has a retention system 46 to retain it in position on the carpeted floor surface during use. The retention system 46 is similar in construction to the retention system 20 described above with reference to FIGS. 1–4.

An optional auxiliary retention system 55 is used to aid in holding the floor mats of the invention in place. The auxiliary retention system is positioned on the mat's underside and in a central location. As best seen in FIG. 12, a gripping plate 56 has a flexible plastic planar surface with lower protrusions 57 uniformly spaced over its bottom surface. The protrusions interact with the carpeted floor of the vehicle to prevent substantial lateral movement. However, the floor mat can be readily removed by simply lifting it in a vertical direction.

Still with reference to FIG. 12, the gripping plate 56 is a thin plate of a polymeric material having sets of vertically extending protrusions on each side. The upper set of protrusions (not shown) is used to permanently hold the gripping plate to the carpet component while the lower set of protrusions 57 is used to hold the floor mat in position when placed on a carpeted floor. The size of the gripping plate is not critical. It can have a length and width sufficient to substantially cover the carpet 20 component's underside. Maximum holding power would be attained in this instance, though is more than is needed under normal use circumstances.

Small carpet floor mats such as the mat 40 of FIG. 10 optionally use a single gripping plate 56 ranging in size from about five inches to about ten inches in length and width and centrally placed near a back edge. Floor mats such as used on a back seat floor compartment or a cargo floor compartment will use a series of similarly shaped and dimensioned gripping plates placed strategically in the corners and/or along the edges of the mat's underside. 5

Optionally, a heel pad is permanently positioned on the auxiliary molded floor mat to be used on the driver's side. Again, with reference to FIG. 10, a heel pad 58 is dimensioned and secured to the top surface of the carpet to cover an area where the driver's heel makes repeated contact while driving. A finished edging such as serging or stitched binding can also be provided for appearance purposes.

Figure 16:
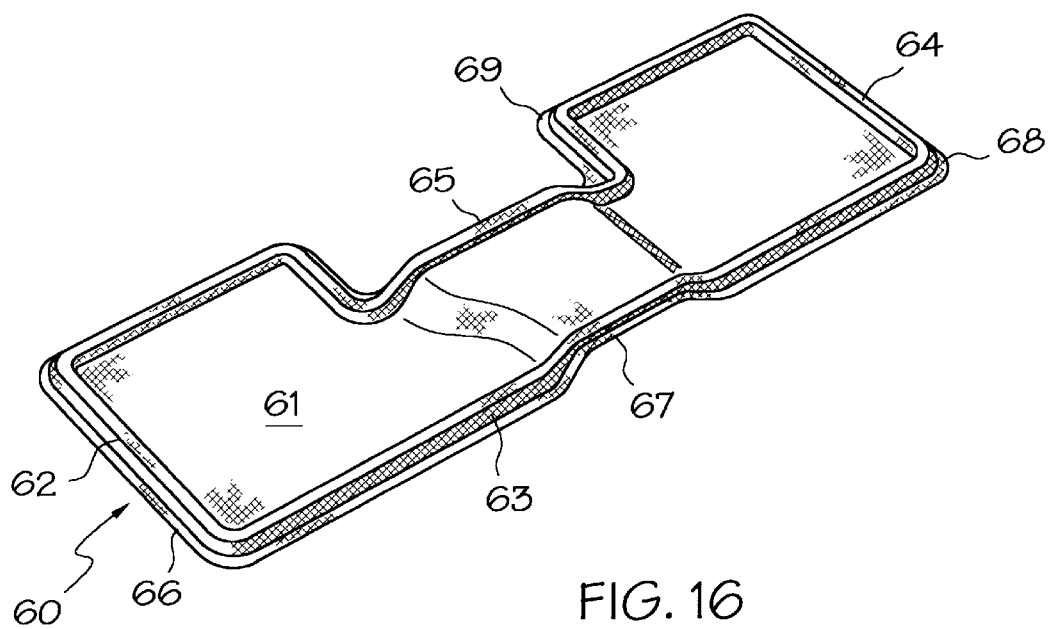
FIG. 16 is a perspective view of a floor mat of the invention designed to fit onto a back seat carpeted floor of a vehicle.

The molded floor mats of the invention are also useful in the back seat carpeted floor area and, when present, the carpeted floor cargo area of the van, pickup truck or sport utility vehicle. As seen in FIG. 16, the floor mat 60 has a profile to fit into the back floor area and over the center hump. A substantially flat base 61 has raised walls 62, 63, 64 and 65 near outside edges of the floor mat and extending substantially vertically from the flat base 61. Each raised wall is double walled similar in construction to the double walls 42 and 43 described above with reference to the floor mat of FIGS. 10–15. Further, each of the raised walls has a substantially horizontally extending floor engaging peripheral lip 66–69.

It should be understood the preferred floor mats of the invention all have at least one raised wall which is double walled with a substantially horizontally extending floor engaging peripheral lip. The raised wall which is double walled is always adjacent an exterior door sill in use. The other raised walls of the floor mat are either single wall with a peripheral lip which structurally blends into a center hump, firewall, seat structure, or side wall or are double walled with the floor engaging peripheral lip. The mats of the invention are custom made to conform with a particular vehicle's interior carpeted area. The use of the double wall or single wall construction is dictated by the intended vehicle's interior lay-out. In all instances, raised walls are present to create the tray-like central area.

The floor mats of the invention are produced by a molding operation. U.S. Pat. No. 5,207,963 describes one very efficient carpet molding process, though other processes are usable. Male and female molds are initially made with profiles which match those of the portion of floor compartment area to be covered. Generally, a fiberglass reinforced resinous material is used to produce the mold, though other molds made of cast metal, e.g. aluminum can as well be used. A blank of the thermoplastic backed carpet and, in certain embodiments, a sheet of the non-slip material are cut to a size which is sufficient to result in a complete molded floor mat, yet with as little excess as possible. Obviously, any excess carpet and non-slip material must ultimately be trimmed off the molded floor mat and discarded as waste.

The carpet blank is positioned in a heat zone to heat its thermoplastic backing. A convection oven can be used, though this phase of the molding operation is more practically done using a bank of heaters which directs its heat to the thermoplastic backing. For example, quartz heaters are able to quickly heat the plastic to the required softening point without adversely affecting the yarn piles. The amount of heat and dwell time in the heat zone will depend on the particular plastic backing and its thickness. Normally, sufficient heat is applied until a 190 degrees F. to 240 degrees F. surface temperature is reached.

The heated carpet blank is then promptly transported to the aforementioned molds. The heated blank can be manually transported to the molds and manually suspended therebetween. A more efficient process results when the heated carpet blank is suspended in an open rack by clamp means. The rack is used for moving and holding the heated blank. The heated carpet blank and non-slip substrate are suspended between the molds and together molded to the shape of the molds when they are closed under pneumatic pressure. The molds are held together to impart the desired configuration to the composite. The molds are allowed to cool either by loss of heat to the surroundings or circulation of a coolant in the molds. The cooling has the effect of allowing the thermoplastic backing to reharden in the molds. Eventually, the molds are opened and the molded floor mat removed. Excess material is trimmed from the floor mat's edges either while still in the molds or after removed.

The resultant molded floor mat is a dimensionally stable article having a desired contoured shape. As should be evident, the floor mat is a one piece construction. No seams, overlap areas, etc. appear in the article. Most importantly a high quality floor mat is efficiently produced. The floor mat fits onto the carpeted floor compartment areas of the van, pickup truck or sport utility vehicle with no substantial folds or wrinkles.

In use, initially the vehicle's door sill is removed or at least lifted a sufficient distance to insert the retention plate so as to be in alignment with the floor mat's underside. The door sill is replaced and tightened to effectively trap the retention plate. Next, the floor mat is simply positioned on the carpeted floor so as to overlie the retention plate. When floor mat 10 of the invention is used, a slight downward pressure is exerted to cause the protrusions on the underside of the retention plate to interact with the carpeted floor and the snap buttons to interact. The floor mat will remain in place under normal use. The plate remains attached to the carpet component due to the first set of snap buttons. The floor mat catches debris. Most importantly, the floor mat is readily removed from the vehicle for cleaning purposes. Once cleaned, the mat is reinstalled.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

What is claimed is:

1. A floor mat for positioning in a carpeted floor compartment area of a vehicle to catch debris, said floor mat having a substantially flat base and having a first raised wall which is double walled with a substantially horizontally extending floor engaging peripheral lip, a second raised wall, a third raised wall and a fourth raised wall, each of said first, second, third and fourth raised walls being at about right angles to one another to form a tray-like central area and further being contoured to neatly conform to the carpeted floor compartment area, further said floor mat having a retention system for operable association with a door sill of the vehicle wherein said retention system includes a substantially flat retention plate extending from the floor mat and lying in substantially the same plane as the substantially flat base of the floor mat and further configured for extending under the door sill to be held thereby, said flat retention plate having attachment means on an upperside thereof to releasably attach to the floor mat.

2. The floor mat of claim 1 wherein the floor mat has a set of snap buttons on an underside and the retention plate of the retention system has a mating set of snap buttons on its upperside to engage the snap buttons on the floor mat.

3. The floor mat of claim 2 wherein the retention plate has a set of protrusions on its underside to engage the carpeted floor of the vehicle.

4. The floor mat of claim 1 wherein the floor mat has a hook or loop fastener on an underside and the retention plate has a mating hook or loop fastener on its upperside to engage the hook or loop fastener on the floor mat.

5. The floor mat of claim 1 wherein the retention plate of the retention system has a set of bolt holes for receiving door sill bolts to engage the door sill and be trapped thereby.

6. The floor mat of claim 1 wherein the first raised wall comprises an inside wall which extends substantially vertically upwardly from the flat base, a top wall which extends substantially horizontally from the inside wall and an outside wall which extends substantially vertically downwardly from the top wall and the peripheral lip extends from the outside wall.

7. The floor mat of claim 1 wherein the floor mat is molded.

8. The floor mat of claim 4 further having a set of spacers on a top side of the retention plate for transmitting a hold down force from the door sill to enhance its retention to the carpeted floor compartment.

9. A molded floor mat for positioning in a carpeted floor compartment area of a vehicle to catch debris and for temporary removal from the vehicle to extract the debris, said floor mat having a substantially flat base with a first raised wall which is double walled with a substantially horizontally extending floor engaging peripheral lip, a second raised wall, a third raised wall and a fourth raised wall, each of said first, second, third and fourth raised walls being at about right angles to one another to form a tray-like central area, further said floor mat having a retention system for operable association with a door sill of the vehicle wherein the retention system includes a substantially flat retention plate with attachment means on an upperside thereof to releasably attach to the floor mat.

10. The molded floor mat of claim 9 wherein the first raised wall comprises an inside wall which extends substantially vertically upwardly from the flat base, a top wall which extends substantially horizontally downwardly from the top wall and the peripheral lip of the first raised wall lies in substantially the same plane as the flat base.

11. The molded floor mat of claim 10 wherein the floor engaging peripheral lip of the first raised wall lies in substantially the same plane as the flat base.

12. The molded floor mat of claim 10 wherein the inside and outside walls of the first raised wall are up to about three inches in height.

13. The molded floor mat of claim 12 wherein the inside and outside walls of the first raised wall are each from about one inch to about two inches in height.

14. The molded floor mat of claim 9 wherein the floor mat is intended for use in a front seat carpeted floor compartment area of the vehicle and wherein the second raised wall is double walled with a substantially horizontally extending floor engaging peripheral lip, the third raised wall further has a substantially horizontally extending peripheral lip which abuts against a center hump of the vehicle and the fourth raised wall slopes upwardly from the flat base and has a peripheral lip to engage a firewall of the vehicle.

15. The molded floor mat of claim 9 wherein the floor mat is intended for use in a back seat carpeted floor compartment of the vehicle and the second raised wall, the third raised wall and the fourth raised wall are each double walled with a substantially horizontally extending floor engaging peripheral lip.

16. The molded floor mat of claim 9 wherein the floor mat has a set of snap buttons on an underside and the retention plate of the retention system has a mating set of snap buttons on its upperside to engage the snap buttons on the floor mat.

17. The molded floor mat of claim 16 wherein the retention plate has a set of protrusions on its underside to engage the carpeted floor of the vehicle.

18. The molded floor mat of claim 9 wherein the floor mat has a hook or loop fastener on an underside and the retention plate has a mating hook or loop fastener on its upperside to engage the hook or loop fastener on the floor mat.

19. The molded floor mat of claim 9 wherein the retention plate of the retention system is substantially flat with a set of bolt holes to engage the door sill and be trapped thereby.

20. The molded floor mat of claim 9 wherein the peripheral lip of the first raised wall has a finished edging and further the second raised wall, third raised wall and fourth raised wall each has a peripheral lip which has a finished edging.

21. The molded floor mate of claim 18 further having a set of spacers on a top side of the retention plate for transmitting a hold down force from the door sill to enhance its retention to the carpeted floor compartment.

22. A floor mat for positioning in a carpeted floor compartment area of a vehicle to catch debris, said floor mat having a substantially flat base and being contoured to neatly conform to the carpeted floor compartment area, said floor mat having a hook or loop fastener on an underside and further said floor mat having a retention system for operable association with a door still of the vehcile wherein the retention system includes a substantially flat retention plate with a mating hook or loop fastener on an upperside thereof to releasably attach to the hook or loop fastener on the underside of the floor mat and a set of spacers on the upperside of the retention plate for transmitting a hold down force from the door still.

23. The floor mat of claim 22 further wherein the retention plate has a set of protrusions on its underside to engage the carpeted floor of the vehicle.

* * * * *